(12) United States Patent
Warshawsky et al.

(10) Patent No.: US 6,298,875 B1
(45) Date of Patent: Oct. 9, 2001

(54) ERGONOMIC FAUCET HANDLE AND SLIDE VALVE FOR SINK

(75) Inventors: Jerome Warshawsky, Hewlett Harbor; Frank Antoniello, Commack, both of NY (US)

(73) Assignee: I.W. Industries, INC, Melville, NY (US)

( * ) Notice: Subject to any disclaimer, the term of this patent is extended or adjusted under 35 U.S.C. 154(b) by 0 days.

(21) Appl. No.: 09/543,146

(22) Filed: Apr. 5, 2000

(51) Int. Cl.[7] .................................................. F16K 31/60
(52) U.S. Cl. ........................... 137/606; 251/231; 251/288
(58) Field of Search ............................... 137/606, 625.4; 251/231, 288, 318

(56) References Cited

U.S. PATENT DOCUMENTS

| | | | |
|---|---|---|---|
| 2,270,932 | * | 1/1942 | Cornelius ................................ 251/231 |
| 4,736,772 | * | 4/1988 | Ostertag et al. ................. 137/625.17 |
| 4,815,703 | | 3/1989 | Antoniello .............................. 251/251 |

* cited by examiner

Primary Examiner—Stephen M. Hepperle
(74) Attorney, Agent, or Firm—Alfred M. Walker

(57) ABSTRACT

A slide valve faucet handle operates when a user arcuately pushes or pulls the handle back and forth in one arcuate axis. A knob atop the slide valve is pushed away from the user in an arcuate fashion to increase flow or pulled toward the user to reduce or shut off flow. The slide valve includes an escutcheon/valve housing at the bottom with a manually graspable knob at the top attached to a movable cover member. The cover member, which is basically hemispherical, has a section removed at an angle to permit the movable cover to advance forward over the escutcheon/valve housing. With the knob in the upright position, the valve is closed. With the knob tilted fully back in a position of use, the slide valve is in the full open position. Intermediate positions regulate flow in a continuous linear manner as expected. There is no spring return, so the slide valve remains open where adjusted along the arcuate axis.

3 Claims, 5 Drawing Sheets

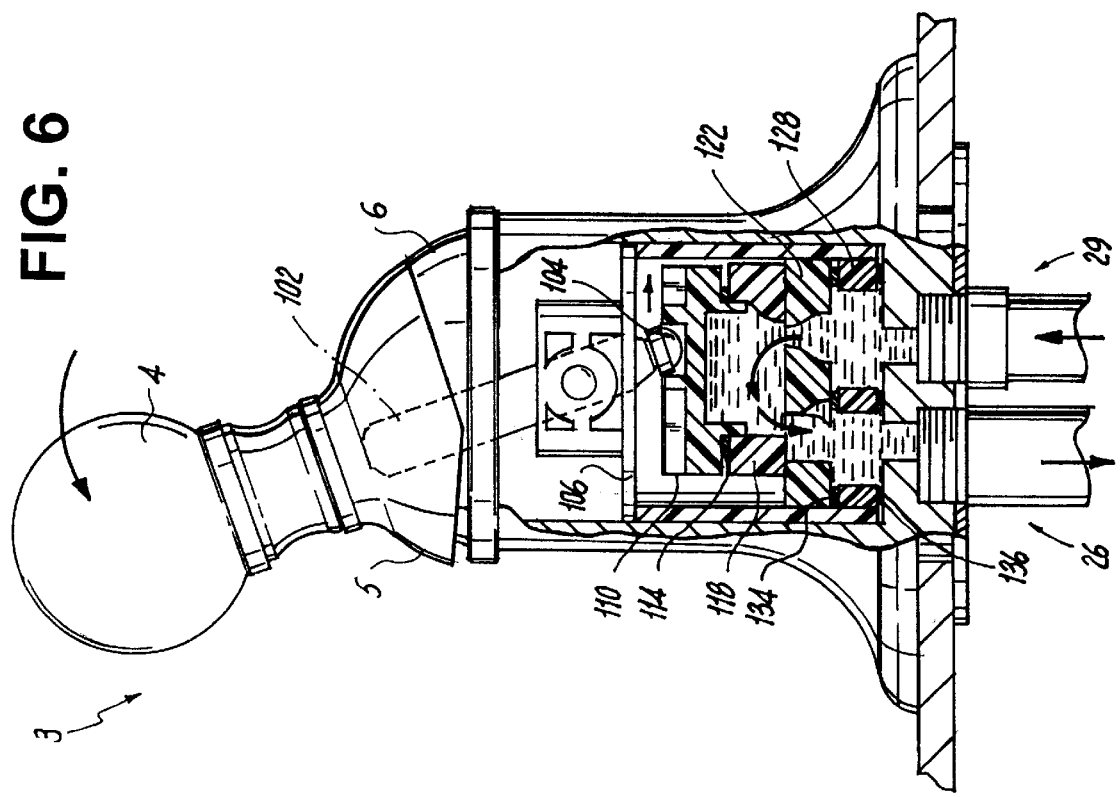

ERGONOMIC FAUCET HANDLE AND SLIDE VALVE FOR SINK

FIELD OF THE INVENTION

The present invention relates to sink faucet handles.

BACKGROUND OF THE INVENTION

While most traditional sink valves use a turning motion for actuation, there have been other alternatives. One class of valves combines the hot and cold water controls into a single valve with a single handle.

This is disconcerting to many users since the conventional placement of a hot water valve on the left and a cold water valve on the right is lost. The operation itself also lacks familiarity since several standards exist.

One type is operated like a joystick with forward/back motions regulating flow while left/right motions regulate temperature. Another type must be pulled up to increase flow and twisted clockwise or counterclockwise to adjust temperature. These compound motions of a single valve are anything but ergonomic. They may look sleek, but standard dual valves are generally easier to use.

Conventional water flow cartridges with pivoting actuators, permit water to flow by pivoting on and off actuator rods, such as shown in FIGS. 1a, 1b and 1c herein.

Moreover, dual valves for a sink with linear sliding motion have been available (as in the Applicants' prior U.S. Pat. No. 4,815,703 of Antoniello).

However, these low profile handles are not ideal for grasping, especially with wet hands. Also, the amount of force required to convert the sliding motion to the internal rotary motion was high since little mechanical advantage was afforded.

OBJECTS OF THE INVENTION

It is therefore an object of the present invention to provide a sink handle valve, which is attractive and easy to use.

It is another object of the present invention to provide a sink handle valve, which does not require rotation to operate.

It is yet another object of the present invention to provide a sink handle valve, which moves in one axis.

It is yet another object of the present invention to provide a sink handle valve, which is easy to maintain.

It is yet another advantage to improve over the disadvantages of the prior art.

SUMMARY OF THE INVENTION

In keeping with these objects and others, which may become apparent, the present invention is a slide valve faucet handle, which operates when the user arcuately pushes or pulls the handle back and forth in one axis, without the need to rotate the handle. The sliding valve regulates flow in a continuous linear manner as expected. The sink handle valve presents the user with separate valves in expected positions.

The attractive knobs atop short shafts are simply pushed away from the user in an arcuate fashion to increase flow or pulled toward the user to reduce or shut off flow. It is like using a one-axis joystick; no two-axis "learning" is needed here with the present invention.

Using a cartridge valve with ceramic internal components, the motion is extremely smooth, and the wear surfaces have long life. Another feature is the ease of maintenance since the valve cartridge is simply replaced entirely from the top side of the sink.

BRIEF DESCRIPTION OF THE DRAWINGS

The present invention can best be understood in conjunction with the accompanying drawings, in which:

FIGS. 1a, 1b and 1c are perspective views of a prior art fluid flow cartridge, wherein FIG. 1a is a perspective view, showing the stem pivoting in phantom lines, FIG. 1b is an exploded top perspective view thereof, and FIG. 1c is an exploded bottom perspective view thereof;

FIG. 5 is a side elevational view in partial cross section view of the escutcheon and valve housing of the present invention; and, FIG. 6 is a side elevational view in partial cross section of the escutcheon and valve housing of the present invention, showing range of motion of the actuation thereof.

DETAILED DESCRIPTION OF THE DRAWINGS

Figure 1A:
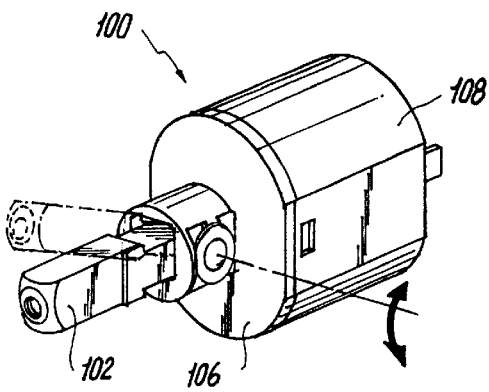
Figure 1B:
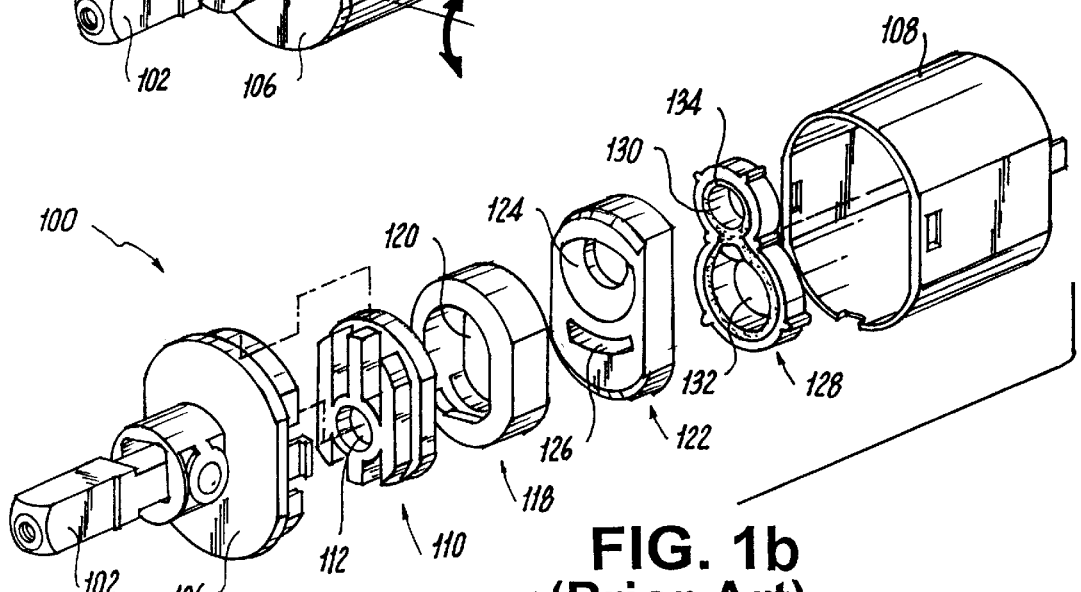
Figure 1C:
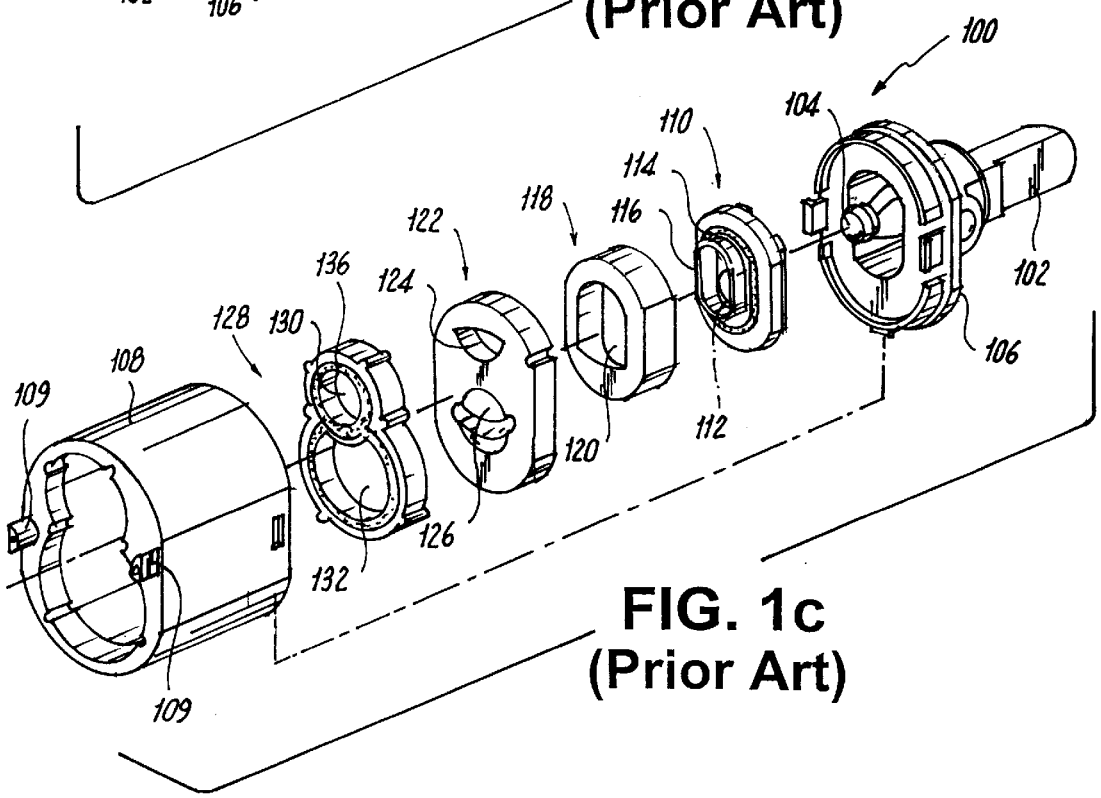

FIGS. 1a, 1b and 1c show the prior art fluid flow cartridge 100 having body 108, face wall 106 and pivoting rod member 102. Pivoting rod member 102 includes anvil 104 moving plug 110, which alternately opens and closes crescent shaped hole 126 of perforated wall 122. Moving plug 110 includes hole 112, wall 114 and shoulder 116 engagable within recess 120 of ceramic collar 118. Anvil 104 is inserted in hole 112 of movable plug 110 so that pivoting of pivoting member 102 and anvil 104 together causes moving plug 110 to open and close crescent hole 126 of perforated wall 122, to permit fluid to flow out of cartridge 100. Further hole 124 is always open for fluid flow into cartridge 100. Outlet wall 128 of cartridge 100 includes sealing gasket 134, inlet 130 and outlet 132.

Figure 2:
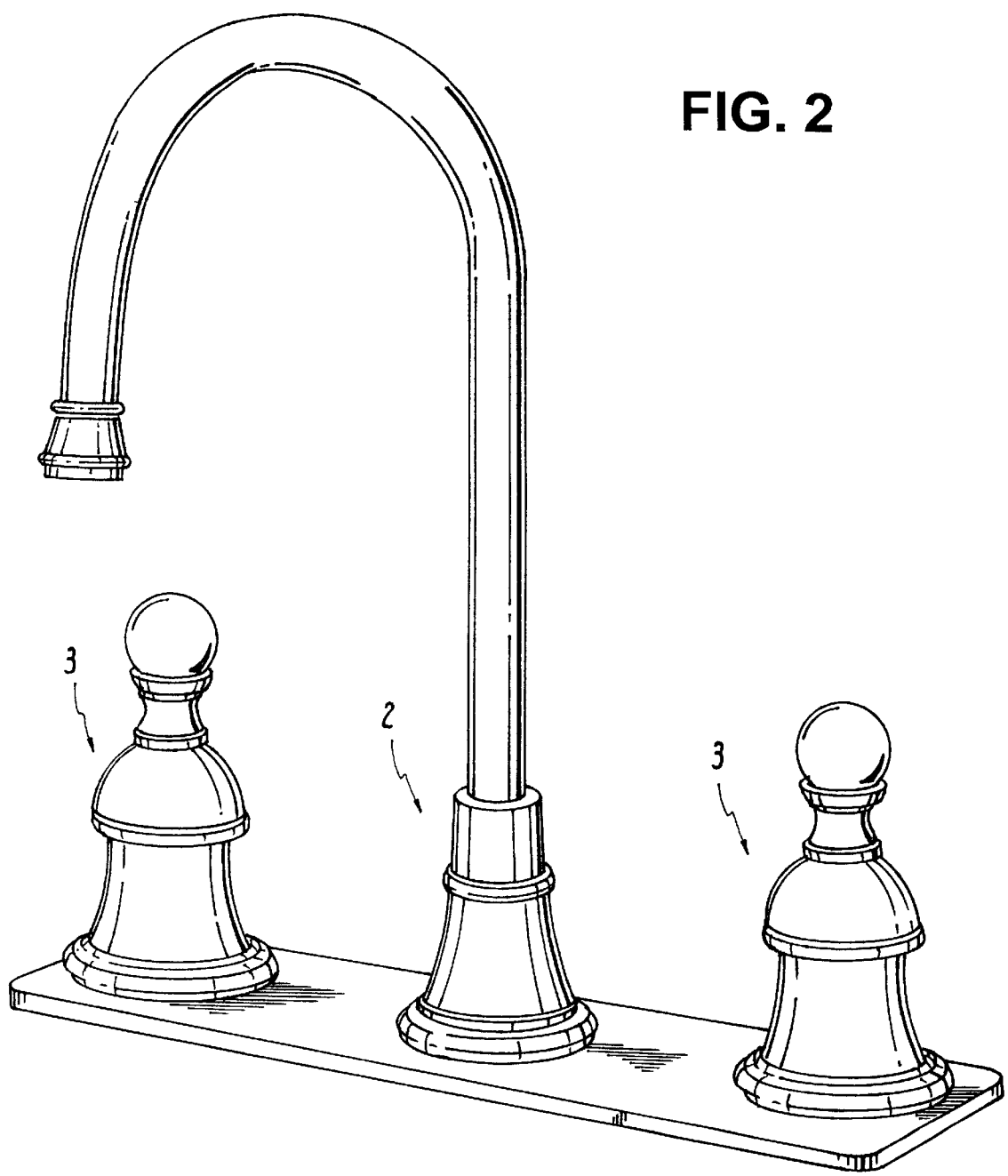
FIG. 2 is a perspective view of a lavatory set using the slide valve of this invention.

FIG. 2 shows a lavatory set 1 with swivel gooseneck water spout assembly 2 and two handle slide valves 3 of this invention.

Figure 3:
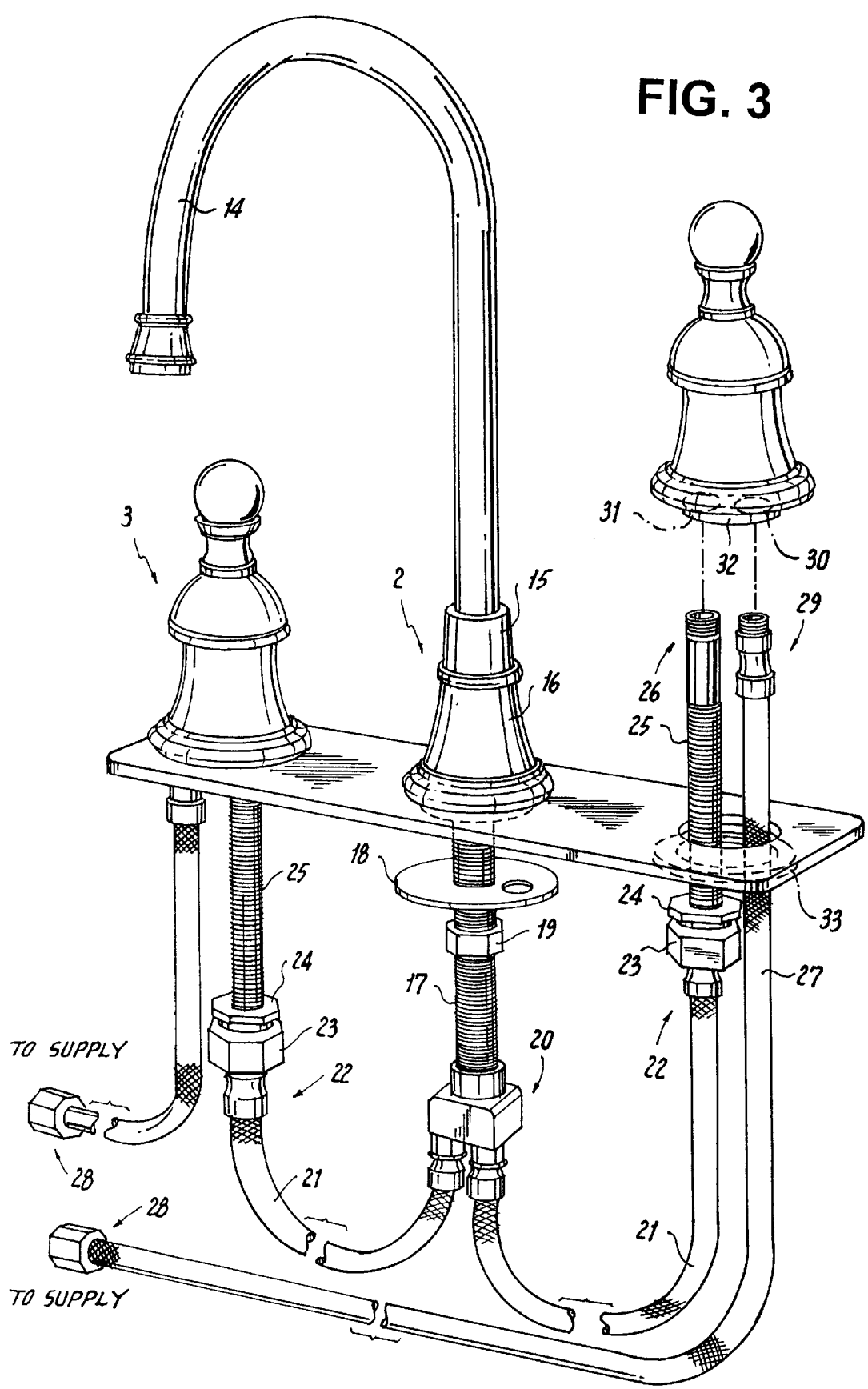
FIG. 3 is a perspective view of a lavatory set of this invention with an exploded detail of one of the valves.

FIG. 3 shows a typical lavatory set using handle slide valves 3 of the present invention. Hot and cold water streams enter proximal ends of flexible inlet conduits 27 at connections 28. These flexible conduits 27 extend through sink countertop 33.

Respective hot and cold water streams enter respective valves 3 at inlets 30 and outlets 31 in base plates 32 of handle slide valves 3.

Inlet conduits 27 are connected at distal ends thereof by threaded connectors 29 to inlets 30 of base plates 32 of each respective hot and cold handle slide valve 3.

Outlet water is fed into threaded mounting nipples 25 connected by threaded ends 26 to respective outlets 31 of handle slide valves 3. Threaded mounting nipples 25 are mounted with washers 24 between nuts 23 to sink countertop 33, and threaded nipples 25 are connected to further flexible conduits 21 at connectors 22. Furthermore, further flexible conduits 21 are connected to T-fitting 20, where hot and cold water streams are mixed before entering spout 14 via rigid threaded mounting nipple 17 attached to a bottom of sink countertop 33 by nut 19 and washer 18. Mixed water is then fed out of spout 14 to the user.

Figure 4:
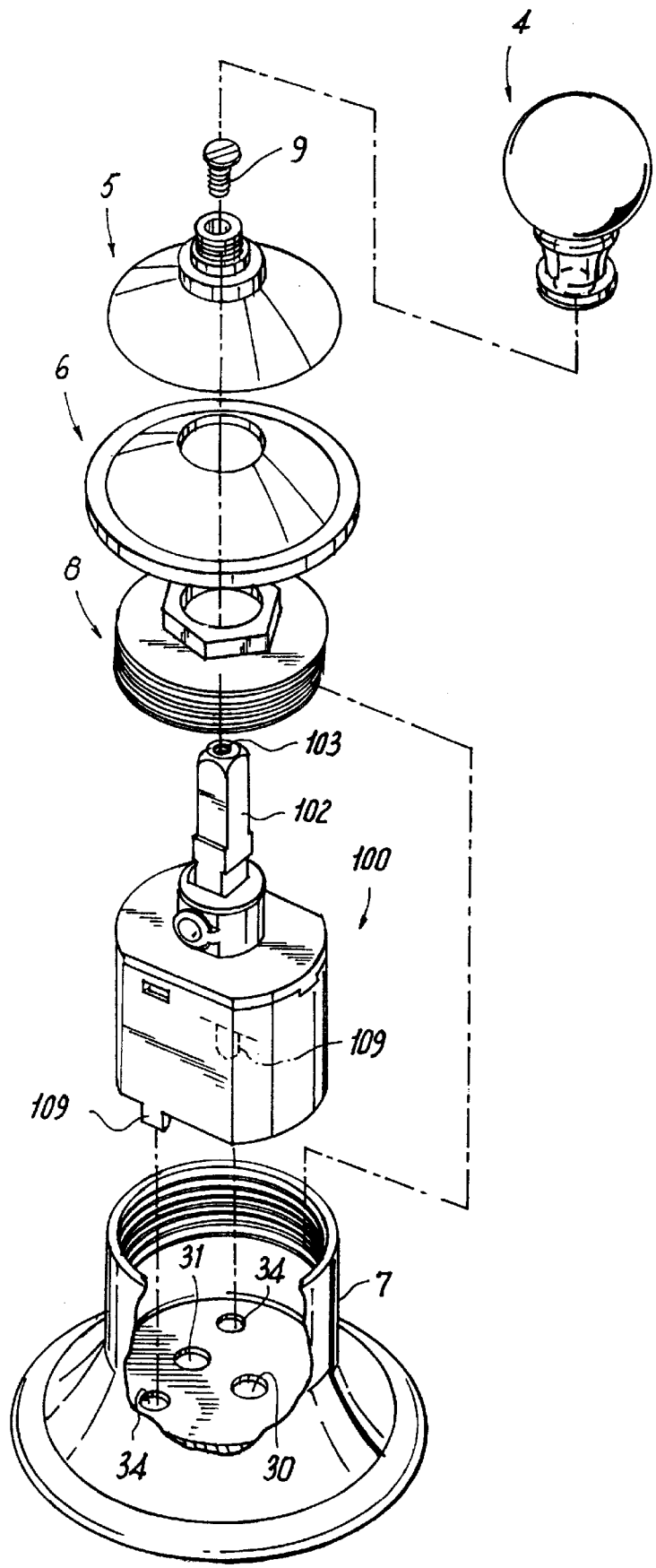
FIG. 4 is an exploded perspective view of handle portion of the present invention showing the position of the prior art cartridge valve used with the present invention.

FIG. 4 is an exploded view of one of the valves 3. It shows the escutcheon/valve housing 7 of handle slide valve 3 at the bottom with knob 4 at the top attached to cover member 5 by fastener 9, such as a screw. Cover member 5 is preferably hemispheric, and overlays shoulder 6 which is also hemispheric to permit cover member 5 to slide over from the closed position of FIG. 5 to the open position of FIG. 6.

Cover member 5 may be of any geometric shape, such as cylindrical or rectangular, and shoulder 6 will bear a similar shape to cover member 5, to permit cover member 5 to slide over shoulder 6.

FIG. 4 also shows threaded valve retaining nut 8 having a recess therein to accommodate pivoting movement of pivoting rod 102 of cartridge 100. Pivoting rod 102 has upper female threaded recess 103 accommodating screw 9 to attach knob 4 thereto. Body 109 of cartridge 100 includes at least one protruding nib 109 insertable within at least one corresponding recess 34 within bottom plate 32 of escutcheon housing 7.

As shown in FIG. 5 movable cover member 3 is preferably hemispheric with a relief area section 5a removed at an angle to permit movable cover 3 to advance forward over corresponding hemispheric shoulder 6 of escutcheon/valve housing 7.

With knob 4 in the upright position, the valve is closed. With knob 4 (and cover member 5) tilted fully back, as shown in FIG. 6, by the directional arrow therein, valve 3 is in the full open position. No further motion back is permitted. The full excursion is at an angle, which is about thirty degrees. The angle of movement of knob 4 off of the closed vertical position is approximately equal to the angle of relief area 5a. Relief area 5a is required for proper operation. Intermediate positions regulate flow in a continuous arcuate linear manner as expected. There is no spring return, so valve 3 remains in position where adjusted.

FIG. 5 also show that the bottom surface of cartridge 110 is flat except for extending locator nibs 109 and formed-in-place gasket 134 of prior art cartridge 100. Gasket 134 separates inlet orifice 30 from outlet orifice 31 of bottom plate 32 of valve escutcheon housing 7 and provides a watertight seal against the bottom of the valve escutcheon housing 7. The seal is effected by torquing down valve retaining nut 8, which bears down on the housing 109 of cartridge valve 100.

It is further known that other modifications may be made to the present invention, without departing from the scope of the present invention, as noted in the Appended claims.

We claim:

1. An ergonomic slide valve and handle for a faucet, said slide valve and handle having a cartridge with a pivoting movable plug alternately permitting fluid flow therethrough, said ergonomic slide valve and handle comprising:

a hollow body having a fluid inlet conduit and a fluid outlet conduit, said ergonomic slide valve operable upon user manipulation of a handle back and forth in one axis in a predetermined arc, said slide valve regulating flow in a continuous arcuate linear axis, said handle being alternately movable in a first direction in an arcuate motion to increase fluid flow or movable in an opposite second direction to reduce and shut off fluid flow, said valve body having the pivoting movable plug of the cartridge therein directing said first and said second fluid flows, an escutcheon/valve housing being provided at a bottom of said valve body with said handle being provided at a top of said valve body, said handle having a movable cover and a manually graspable knob attached to said movable cover, said knob and said movable cover being movable in unison along said arcuate axis, wherein when said knob and said movable cover are in an upright position, said slide valve is closed to fluid flow therethrough and wherein when said knob and said movable cover are tilted fully back, said slide valve is open to fluid flow therethrough, wherein a full excursion of said knob and said movable handle is about thirty degrees off a vertical axis, wherein said movable cover is hemispheric with a section removed at an angle to permit said movable cover to advance forward over a shoulder of said escutcheon/valve housing, said shoulder bearing a shape corresponding to a shape of said movable cover.

2. The ergonomic slide valve as in claim 1, wherein intermediate movement positions of said knob and cover regulate fluid flow in a continuous linear flow.

3. The ergonomic slide valve as in claim 1 wherein said ergonomic slide valve is connected to a hot water inlet, said ergonomic slide valve communicating at an outlet end with a connector to a faucet spout, said ergonomic slide valve being provided with a second ergonomic slide valve connected to a cold water inlet, said second ergonomic slide valve also communicating at a further outlet and with a further connector to said faucet spout.

\* \* \* \* \*